United States Patent
Kobayashi

(10) Patent No.: US 9,459,456 B2
(45) Date of Patent: Oct. 4, 2016

(54) DISPLAY DEVICE AND CONTROL METHOD THEREOF

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/141,008

(22) Filed: Dec. 26, 2013

(65) Prior Publication Data

US 2014/0191928 A1  Jul. 10, 2014

(30) Foreign Application Priority Data

Jan. 7, 2013  (JP) .................. 2013-000362

(51) Int. Cl.
*G02B 27/01* (2006.01)
*G06F 3/01* (2006.01)

(52) U.S. Cl.
CPC ........... *G02B 27/0172* (2013.01); *G06F 3/011* (2013.01); *G02B 2027/0141* (2013.01)

(58) Field of Classification Search
USPC ..................... 345/8, 156, 207, 474
See application file for complete search history.

(56) References Cited

U.S. PATENT DOCUMENTS

| 8,633,870 | B2 * | 1/2014 | Otsuki | 345/8 |
| 2004/0130556 | A1 * | 7/2004 | Nokiyama | 345/617 |
| 2010/0328331 | A1 * | 12/2010 | Iwaki et al. | 345/547 |
| 2012/0235886 | A1 * | 9/2012 | Border | G02B 27/0093 345/8 |
| 2013/0147838 | A1 * | 6/2013 | Small | G06F 3/013 345/633 |
| 2013/0321858 | A1 * | 12/2013 | Takabatake | H04N 1/00408 358/1.15 |
| 2013/0329247 | A1 * | 12/2013 | Takabatake | H04N 1/00408 358/1.15 |
| 2014/0111542 | A1 * | 4/2014 | Wan | G06F 17/30253 345/633 |

FOREIGN PATENT DOCUMENTS

| JP | 2001-265723 A | 9/2001 |
| JP | 2005-18794 A | 1/2005 |

* cited by examiner

*Primary Examiner* — Jason Olson
*Assistant Examiner* — Deeprose Subedi
(74) *Attorney, Agent, or Firm* — ALG Intellectual Property, LLC

(57) ABSTRACT

A head-mounted display device includes: a medium recognizing section that detects information that is viewable by a user; a display section that performs display to be viewable by the user; and an update processing section that causes the display section to display, to overlap with at least a part of the information detected by the medium recognizing section, new information corresponding to the information.

12 Claims, 6 Drawing Sheets

DISPLAY DEVICE AND CONTROL METHOD THEREOF

BACKGROUND

1. Technical Field

The present invention relates to a display device, and a control method thereof.

2. Related Art

A technique for providing content such as news instead of an existing medium such as a newspaper or magazine has been proposed (for example, see JP-A-2001-265723 and JP-A-2005-18794). A system disclosed in JP-A-2001-265723 and JP-A-2005-18794 delivers newspaper articles through a communication line such as the Internet, so that a purchaser reads the articles by an information terminal display or the like.

This kind of system has an advantage in that it is possible to immediately provide the latest information compared with the existing medium such as a magazine or newspaper. On the other hand, the magazine or newspaper that is the existing medium is excellent, compared with the information terminal display, in that it is possible to list a large amount of information, portability is excellent, economic loss is small even if the medium is lost, and a waiting time for viewing information is short, for example. However, there has not existed an information providing technique that satisfies these advantages.

SUMMARY

An advantage of some aspects of the invention is to provide a display device capable of immediately providing information with excellent usability similarly to the existing medium, and a control method thereof.

An aspect of the invention is directed to a display device including a detecting section that detects information that is viewable by a user; a display section that performs display to be viewable by the user; and a control section that causes the display section to display, to overlap with at least a part of the information detected by the detecting section, different information corresponding to the information.

According to this configuration, the different information corresponding to the information is displayed to overlap with the information viewed by the user. Thus, it is possible to change or update the information viewed by the user by the display device, and it is thus possible to provide the different information to the user without changing the information that is present in a range that is viewable by the user. Accordingly, for example, it is possible to perform an operation of updating old information to the latest information, and it is thus possible to display information with excellent usability similarly to the existing medium such as a magazine or newspaper, and to immediately provide the information.

Another aspect of the invention is directed to a display device including a display section that displays an image viewed to overlap with an outside scene; a medium detecting section that detects a medium viewed as the outside scene; and a control section that arranges and causes the display section to display, to overlap with at least a part of information recorded on the medium, new information corresponding to the information in an overlap area.

According to this configuration, the new information overlaps with at least the part of the information recorded on the medium to be displayed, in which the overlapping information is the new information corresponding to the overlap target information. Thus, for example, it is possible to display information as if information recorded on a medium such as a magazine or newspaper is updated to the latest information. Thus, it is possible to display information with excellent usability similarly to the existing medium such as a magazine or newspaper, and to immediately provide the information.

Still another aspect of the invention is directed to the display device described above, wherein the display device includes an attribute determining section that determines an attribute of the information recorded on the medium; and an information obtaining section that obtains the new information corresponding to the information on the basis of the attribute of the information that is a target with which the new information overlaps by the display section, in which the control section causes the display section to display the new information obtained by the information obtaining section.

According to this configuration, it is possible to determine the attribute of the information recorded on the medium, and to display the new information relating to the hidden information, by the display device.

Yet another aspect of the invention is directed to the display device described above, wherein the control section selects update target information from the information recorded on the medium on the basis of the attribute of the information determined by the attribute determining section.

According to this configuration, it is possible to select the hidden information on the basis of the attribute of the information recorded on the medium, and it is thus possible to appropriately select information in a case where plural pieces of information are recorded, to provide new information.

Still yet another aspect of the invention is directed to the display device described above, wherein the control section selects information from which the new information is obtainable by the information obtaining section from among the information recorded on the medium, as the update target information.

According to this configuration, in a case where plural pieces of information are recorded, by selecting information from which new information corresponding thereto is obtainable, and by hiding information on the medium in a case where the new information can be provided, for example, it is possible to appropriately select information to provide the latest information.

Further another aspect of the invention is directed to the display device described above, wherein the control section arranges the new information according to the shape and size of an area where information on the medium is hidden.

According to this configuration, it is possible to appropriately provide the latest information without impairing the visibility of different information recorded in the vicinity of the hidden information.

Still further another aspect of the invention is directed to the display device described above, wherein the display device is provided as a head-mounted display device, and the medium detecting section includes a photographing section that photographs the outside scene in a range that overlaps with the image displayed by the display section, and an image processing section that detects the medium from an image photographed by the photographing section.

According to this configuration, using the display device mounted on the head of a user, it is possible to automatically provide the latest information to overlap with the information on the medium viewed by a wearer, to thus enhance the convenience.

Yet further another aspect of the invention is directed to the display device described above, wherein the display device is a head-mounted display device that causes a user to view an image; and the display section includes an image light generating section that generates and emits image light for display of an image using display image data and an optical member that guides the emitted image light to eyes of the user; and light of the outside scene passes through the optical member and is incident onto the eyes of the user together with the image light.

According to this configuration, using the head-mounted display device that guides the image light to the eyes of the user by the optical member and guides the light of the outside scene passed through the optical member to the eyes of the user, it is possible to display the new information to overlap with the information viewed as the outside scene. Thus, it is possible to update the information viewed by the user by the display device, and to provide a variety of information to the user.

Still yet further another aspect of the invention is directed to a control method of a display device, including detecting information that is viewable by a user; and displaying, to overlap with at least a part of the detected information, different information corresponding to the information, by a display section that performs display to be viewable by the user.

According to this configuration, the different information corresponding to the information is displayed to overlap with the information viewed by the user. Thus, it is possible to change or update the information viewed by the user by the display device, and it is possible to provide the different information to the user without changing the information that is present in a range that is viewable by the user. Accordingly, for example, it is possible to perform an operation of updating old information to the latest information, and it is thus possible to display information with excellent usability similarly to the existing medium such as a magazine or newspaper, and to immediately provide the information.

A further another aspect of the invention is directed to a control method of a display device that includes a display section that displays an image viewed to overlap with an outside scene, the method including detecting a medium viewed as the outside scene; and arranging and causing the display section to display, to overlap with at least a part of information recorded on the medium, new information corresponding to the information in an overlap area.

According to this configuration, the new information overlaps with at least the part of the information recorded on the medium to be displayed, in which the overlapping information is the new information corresponding to the overlap target information. Thus, for example, it is possible to display information as if information recorded on a medium such as a magazine or newspaper is updated to the latest information. Thus, it is possible to display information with excellent usability similarly to the existing medium such as a magazine or newspaper, and to immediately provide the information.

According to the aspects of the invention, it is possible to display information and to immediately provide the information with excellent usability similarly to the existing medium such as a magazine or newspaper.

BRIEF DESCRIPTION OF THE DRAWINGS

The invention will be described with reference to the accompanying drawings, wherein like numbers reference like elements.

FIGS. 5A and 5B are diagrams illustrating an operation in which a head-mounted display device updates information for display, in which FIG. 5A illustrates a state where a medium of a processing target is viewed, and FIG. 5B illustrates an example of an operation of recognizing the medium.

FIGS. 6A and 6B are diagrams illustrating an operation in which a head-mounted display device updates information for display, in which FIG. 6A illustrates a state where a guide for information updating is displayed, and FIG. 6B illustrates a state where information is updated.

DESCRIPTION OF EXEMPLARY EMBODIMENTS

Hereinafter, embodiments of the invention will be described with reference to the accompanying drawings.

Figure 1:
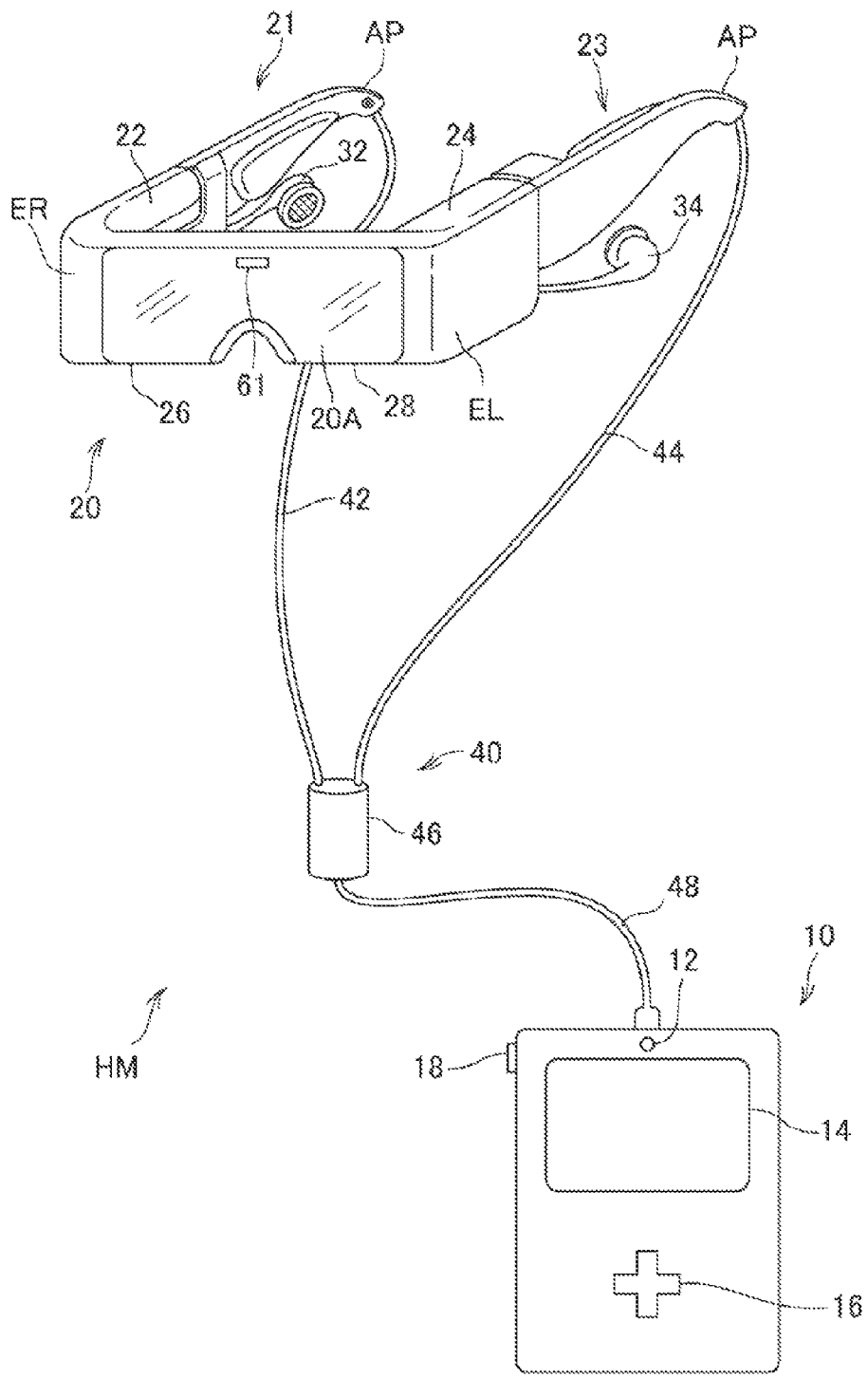
FIG. 1 is a diagram illustrating an appearance of a head-mounted display device according to an embodiment of the invention.

FIG. 1 is a diagram illustrating an appearance of a head-mounted display device according to an embodiment of the invention.

A head-mounted display device HM is a head-mounted display device mounted on a head of a user, and is referred to as a head mounted display (HMD). The head-mounted display device HM of the present embodiment corresponds to a light transmissive head-mounted display device through which a user can directly view an outside scene at the same time when viewing a virtual image.

As shown in FIG. 1, the head-mounted display device HM is provided with an image display section 20 mounted on the head of the user, and a control device 10 that controls the image display section 20. The image display section 20 includes a right holding section 21, a right display drive section 22, a left holding section 23, a left display drive section 24, a right optical image display section 26 and a left optical image display section 28.

The right optical image display section 26 and the left optical image display section 28 are respectively disposed in front of the right eye and the left eye of the user, and are integrally connected to each other at a position corresponding to an area between eyebrows of the user. The right holding section 21 extends from an end portion ER of the right optical image display section 26, and the left holding section 23 extends from an end portion EL of the left optical image display section 28.

The right holding section 21 is disposed beside the right side of the head of the user, and a tip thereof is engaged with the right ear of the user. Further, the left holding section 23 is disposed beside the left side of the head of the user, and a tip thereof is engaged with the left ear of the user. The head-mounted display device HM is supported by the tips of the right holding section 21 and the left holding section 23 and a nose pad section provided at a lower end of a junction section of the right optical image display section 26 and the left optical image display section 28.

The right display drive section 22 is built in a base end section of the right holding section 21, and the left display drive section 24 is built in a base end section of the left holding section 23. The head-mounted display device HM causes the right eye and the left eye of the user to view an image using the right display drive section 22 and the left display drive section 24, respectively.

A light adjusting plate 20A is provided on a front side, that is, on a front surface side of the right optical image display section 26 and the left optical image display section 28. The light adjusting plate 20A is detachably mounted to the right optical image display section 26 and the left optical image display section 28, and thus, plural types of light adjusting plates 20A may be mounted to be exchangeable. The light adjusting plate 20A is an optical element of a thin plate shape, and may employ various elements such as an element of which optical transparency is almost zero, an element that is approximately transparent, an element in which the intensity of light is attenuated to be transmitted, or an element that attenuates or reflects light of a specific wavelength. By appropriately selecting an optical characteristic of the light adjusting plate 20A, it is possible to adjust the intensity of outside light incident onto the right optical image display section 26 and the left optical image display section 28 from the outside. In the present embodiment, a case where the light adjusting plate 20A that has at least light transparency of such a degree that a user who wears the head-mounted display device HM can view the outside scene will be described. The light adjusting plate 20A also has a function of protecting a right light guide plate 261 (optical member) and a left light guide plate 262 (optical member) (to be described later) from damage, attachment of dirt or the like.

Further, on the front surface of the head-mounted display device HM, a camera 61 (photographing section) is disposed on a boundary portion between the right optical image display section 26 and the left optical image display section 28. The position of the camera 61 approximately corresponds to the center of the front surface of the head-mounted display device HM, which is an intermediate position of the left and right eyes of the user.

A photographing direction, that is, a view angle of the camera 61 is a front direction of the head-mounted display device HM, that is, a direction in which at least a part of an outside scene in a visual field direction of the user in a state where the user wears the head-mounted display device HM is imaged. Preferably, the photographing direction is a direction in which an outside scene range that the user views through a face 262A is photographed. Further, more preferably, a range wider than the range viewed by the user through the face 262A is photographed. That is, it is preferable that the entire visual field of the user through the light adjusting plate 20A can be photographed.

The camera 61 intermittently photographs still images or photographs moving images, and outputs the photographed image data. The camera 61 in the present embodiment is shown as a single digital camera, but a stereo video camera that includes plural digital cameras may be employed.

Figure 2:
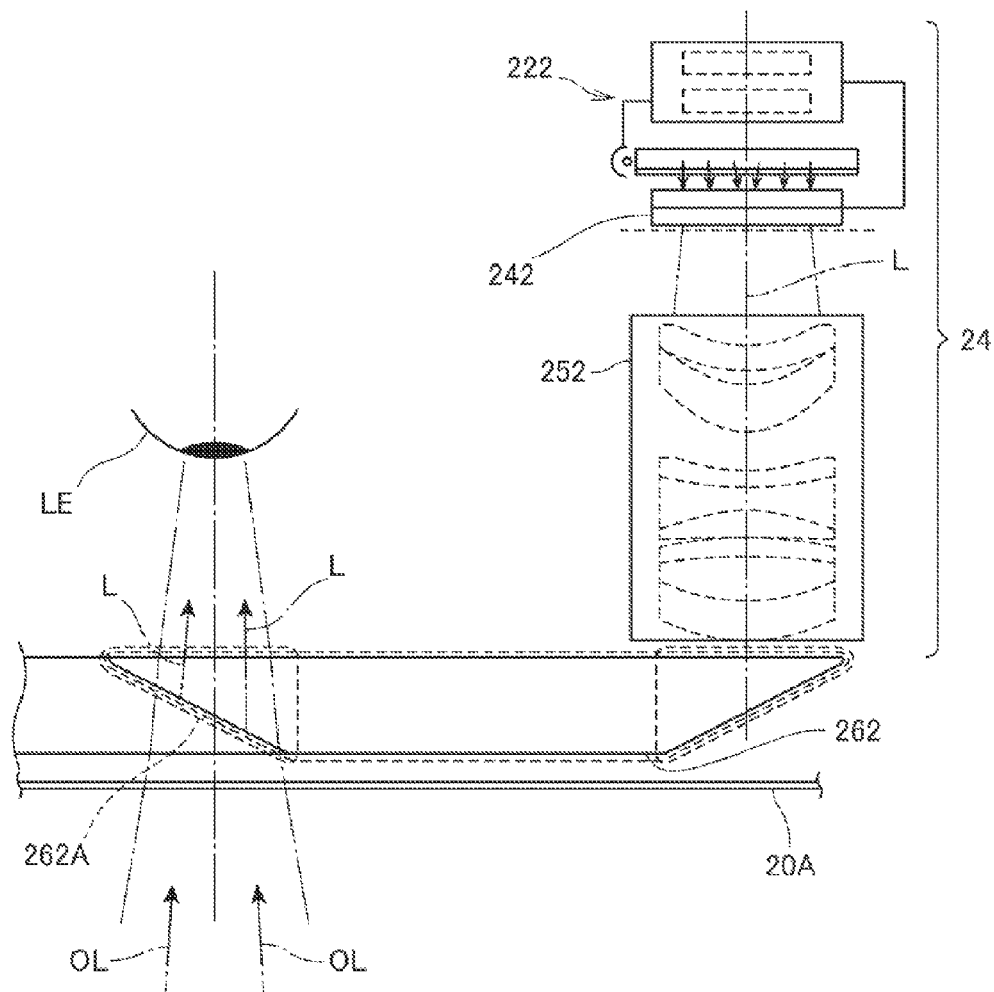
FIG. 2 is a diagram illustrating a schematic configuration of an optical system of a head-mounted display device.

FIG. 2 is a diagram illustrating a schematic configuration of an optical system in the image display section 20. FIG. 2 is a plan view illustrating a configuration of the left display drive section 24 and the left light guide plate 262 that cause the left eye LE of the user to view a virtual image. Since respective configurations that cause the left eye and the right eye of the user to view the virtual image are laterally symmetrical, only the left display drive section 24 and the left light guide plate 262 will be described herein.

The left display drive section 24 of the image display section 20 includes a left backlight 222 that includes a light source such as an LED and a diffusion plate, a transmissive left liquid crystal display (LCD) 242 disposed on an optical path of light emitted from the diffusion plate of the left backlight 222, and a left projection optical system 252 that includes a lens group that guides an image light L that passes through the left LCD 242 and the like.

The left projection optical system 252 is formed by a collimator lens that forms the image light L emitted from the left LCD 242 into a parallel light flux. The image light L passed through the left projection optical system 252 is incident onto the left light guide plate 262. The left light guide plate 262 is a prism in which plural reflection surfaces that reflect the image light L are formed, in which the image light L is subjected to plural reflections in the left light guide plate 262 to be guided to the left eye LE. Further, the image light L reflected on the face 262A disposed in front of the left eye LE is emitted from the right optical image display section 26 toward the left eye LE, and the image light L forms an image on a retina of the left eye LE, to thereby cause the user to view the image.

Here, the left projection optical system 252 and the left light guide plate 262 are collectively referred to as a "light guide section". The light guide section may use an arbitrary technique as long as a virtual image is formed in front of the eyes of the user using the image light, and for example, may use a diffraction grating or a semi-transmission reflection film.

The face 262A is configured by a half mirror. Thus, an outside light OL that passes through the light adjusting plate 20A, in addition to the image light L reflected on the face 262A, is incident onto the left eye LE of the user. That is, in the head-mounted display device HM, the image light L of the image processed therein and the outside light OL overlap each other to be incident onto the eyes of the user. Thus, the user may view the outside scene through the light adjusting plate 20A of the head-mounted display device HM, and thus, may view the image based on the image light L that overlaps with the outside scene. Thus, the head-mounted display device HM may be referred to as a see-through display device.

As the image light L guided to both eyes of the user of the head-mounted display device HM is formed on the retinas of the user, the user views a virtual image. Here, the visibilities of the outside scene and the virtual image of the user are influenced by balance of the intensities of light of the outside light OL and the image light L. In a case where the intensity of the outside light OL is higher than that of the image light L, the outside scene is more visible, but the visibility of the virtual image processed (displayed) by the head-mounted display device HM is low. On the other hand, in a case where the intensity of the image light L is higher than that of the outside light OL, the visibility of the outside scene is low while the visibility of the virtual image processed (displayed) by the head-mounted display device HM is high.

Returning to FIG. 1, the head-mounted display device HM includes a connection section 40 that connects the image display section 20 to the control device 10. The connection section 40 includes a main body cable 48 connected to the control device 10, and two right and left cables 42 and 44 that are branched from the main body cable 48 through a connection member 46. The right cable 42 is inserted in a casing of the right holding section 21 and is connected to the right display drive section 22. The left cable 44 is inserted in a casing of the left holding section 23 and is connected to the left display drive section 24.

The image display section 20 and the control device perform transmission of various signals through the connection section 40. For example, a metal cable or an optical fiber may be employed as the right cable 42, the left cable 44 and the main body cable 48.

The control device 10 is a device for operating the head-mounted display device HM. The control device 10 includes a lighting section 12, a touch pad 14, a cross key 16, and a power source switch 18.

The lighting section 12 is provided with an indicator that includes an LCD or the like, and notifies an operation state (for example, power ON/OFF or the like) of the head-mounted display device HM according to light emission state thereof. The touch pad 14 detects a contact operation through a finger of the user, and outputs a signal based on detection content. The cross key 16 is a key corresponding to up, down, left and right directions, and outputs a signal based on a pressing operation. The power switch 18 is a switch that switches a power state of the head-mounted display device HM.

Figure 3:
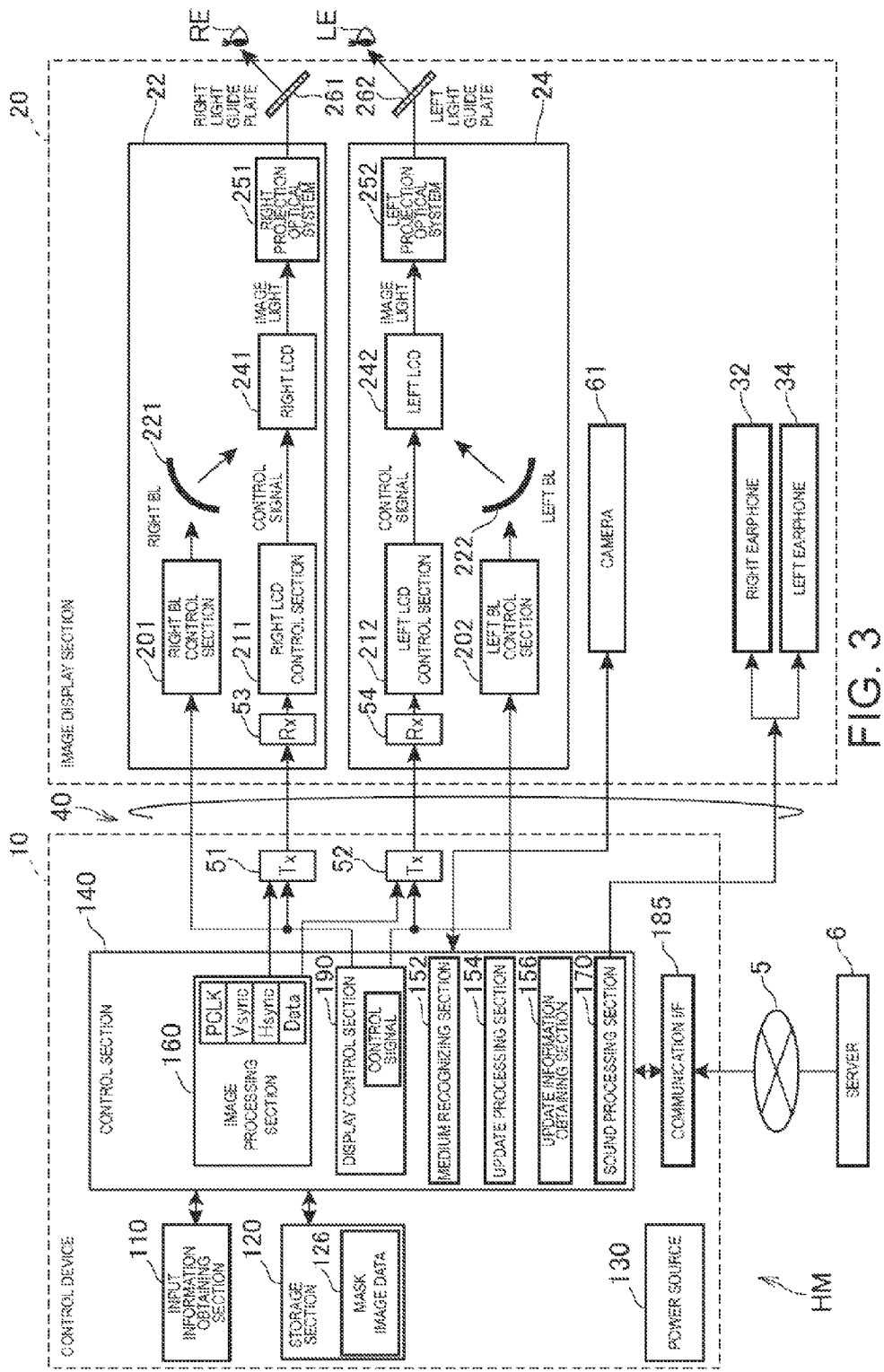
FIG. 3 is a functional block diagram of a control system of a head-mounted display device.

FIG. 3 is a functional block diagram illustrating a configuration of a control system of the head-mounted display device HM.

The control device 10 includes an input information obtaining section 110, a storage section 120, a power source 130, a control section 140, a communication interface 185, and transmission sections (Tx) 51 and 52. The respective sections are connected to each other through a bus (not shown).

The input information obtaining section 110 obtains signals based on inputs through the touch pad 14, the cross key 16, the power switch 18 and the like, for example. The storage section 120 stores a program or data using a semiconductor memory element, a magnetic storage device or the like. The power source 130 includes a secondary battery, for example, and supplies power to the respective sections of the head-mounted display device HM.

The control section 140 includes a CPU, a ROM, a RAM or the like, and executes a program stored in the ROM or the storage section 120 to control the respective sections of the head-mounted display device HM. The control section 140 executes the program to function as a medium recognizing section 152 (medium detecting section, attribute determining section and image processing section), an update processing section 154 (control section), an update information obtaining section 156 (information obtaining section), an image processing section 160, a sound processing section 170, and a display control section 190.

The image processing section 160 generates a signal to be supplied to the image display section 20 on the basis of content or the like input through the communication interface 185, and transmits the result to the image display section 20. In a case where an analog signal is input through the communication interface 185, the image processing section 160 performs an A/D conversion process to generate digital image data (Data), and outputs the result together with a clock signal (PCLK), a vertical synchronization signal (VSync) and a horizontal synchronization signal (HSync). Further, in a case where digital image data is input through the communication interface 185, the image processing section 160 performs various processes such as frame rate conversion or resolution conversion, and outputs the processed digital image data together with a clock signal, a vertical synchronization signal and a horizontal synchronization signal.

The signal output by the image processing section 160 is input to the right display drive section 22 of the image display section 20 through the transmission section 51, and is input to the left display drive section 24 through the transmission section 52.

The display control section 190 generates control signals that control the right display drive section 22 and the left display drive section 24. Specifically, the display control section 190 individually controls driving ON/OFF of the right LCD 241 using a right LCD control section 211, driving ON/OFF of a right backlight 221 using a right backlight control section 201, driving ON/OFF of the left LCD 242 using a left LCD control section 212, driving ON/OFF of a left backlight 222 using a left backlight control section 202, or the like according to the control signals, to thereby control generation and emission of image light in each of the right display drive section 22 and the left display drive section 24. For example, the display control section 190 causes both of the right display drive section 22 and the left display drive section 24 to generate image light, only one of them to generate image light, or neither of them to generate image light.

The display control section 190 transmits the control signals for the right LCD control section 211 and the left LCD control section 212 through the transmission sections 51 and 52, respectively. Further, the display control section 190 transmits the control signals for the right backlight control section 201 and the left backlight control section 202, respectively.

The sound processing section 170 obtains a sound signal included in content, amplifies the obtained sound signal, and supplies the amplified sound signal to a right earphone 32 and left earphone 34 of the image display section 20 through the connection section 40.

The communication interface 185 is connected to an external communication line 5, and executes communication with an external server 6 through the communication line 5. The communication interface 185 transmits or receives a variety of data to or from the server 6 under the control of the control section 140. A specific communication line that connects the communication interface 185 and the communication line 5 and forms the communication line 5 may be provided in a wired or wireless manner.

Further, the communication interface 185 is connected to an external device such as a personal computer, a mobile phone terminal, a game machine, or a video reproduction device such as a DVD player, and outputs an analog video signal or image data of a variety of content input from these devices to the display control section 190. The communication interface 185 may include a connector or an interface circuit that is connected to these devices in a wired manner, or may include a short-range wireless communication interface such as a wireless LAN or Bluetooth (registered trademark).

The image display section 20 includes the right display drive section 22, the left display drive section 24, the right light guide plate 261 as the right optical image display section 26, the left light guide plate 262 as the left optical image display section 28, the camera 61, the right earphone 32 and the left earphone 34.

The right display drive section 22 includes a reception section (Rx) 53, the right backlight (BL) control section 201 and the right backlight (BL) 221, the right LCD control section 211 and the right LCD 241 that function as a display element, and the right projection optical system 251.

The reception section 53 receives a signal input from the transmission section 51. The right backlight control section 201 drives the right backlight 221 on the basis of a control signal input to the reception section 53. The right LCD control section 211 drives the right LCD 241 on the basis of a clock signal, a vertical synchronization signal, a horizontal synchronization signal and right eye image data input to the reception section 53. The right LCD 241 is a transmissive liquid crystal panel in which plural pixels are arranged in a matrix form, which is driven by the right LCD control section 211 to draw various images.

Similarly, the left display drive section 24 includes a reception section (Rx) 54, the left backlight (BL) control section 202 and the left backlight (BL) 222, the left LCD 242 that functions as a display element, and the left projection optical system 252.

The right backlight control section 201, the right LCD control section 211, the right backlight 221 and the right LCD 241 are collectively referred to as a right "image light generating section", and the left backlight control section 202, the left LCD control section 212, the left backlight 222 and the left LCD 242 are collectively referred to as a left "image light generating section". Further, the right holding section 21 and the left holding section 23 are collectively and simply referred to as a "holding section", the right display drive section 22 and the left display drive section 24 are collectively and simply referred to as a "display drive section", and the right optical image display section 26 and the left optical image display section 28 are collectively and simply referred to as an "optical image display section".

Further, the display section according to the invention is configured by the display drive section and the image light generating section. The display section may include an optical image display section, or may include a light guiding section.

The reception section 54 receives a signal input from the transmission section 52. The left backlight control section 202 drives the left backlight 222 on the basis of a control signal input to the reception section 54. The left LCD control section 212 drives the left LCD 242 on the basis of a clock signal, a vertical synchronization signal, a horizontal synchronization signal and left eye image data input to the reception section 54. The left LCD 242 is a transmissive liquid crystal panel in which plural pixels are arranged in a matrix form, which is driven by the left LCD control section 212 to draw various images.

In the following description, the virtual image that the user views using the head-mounted display device HM is referred to as an "image". This image is an image recognized by the user when images formed in the right LCD 241 and the left LCD 242 are formed on the retinas of the user. Further, the operation of the head-mounted display device HM that causes the user to view the virtual image is referred to as "display".

The control section 140 displays images of a variety of content input through the communication interface 185 using the image display section 20. Further, when displaying image of content including sound, the control section 140 displays the image and outputs sound through the right earphones 32 and the left earphone 34. Thus, the user may view and hear a variety of video contents.

Further, in a case where a medium on which information is visibly recorded is present in a photographing view angle of the camera 61, the head-mounted display device HM has a function of recognizing the information recorded on the medium and displaying new information corresponding to the information stored on the medium. Here, for example, the medium may include printed material such as a newspaper, magazine or book, and the number of sheets that forms the printed material, a bookbinding type or the like does not matter. Further, a display surface of a display device that displays an image on the display surface may be used as the medium.

The medium recognizing section 152 included in the control section 140 detects the medium from image data photographed by the camera 61, and recognizes information recorded on the detected medium. In a case where plural pieces of information are recorded on the detected medium, the medium recognizing section 152 divides the plural pieces of information in a predetermined unit, to thereby individually recognize the divided pieces of information. Further, in a case where plural pieces of information among the recognized information form one bundle of information, the medium recognizing section 152 may gather the information to recognize the information as one piece of information.

Further, the medium recognizing section 152 may specify an attribute of each recognized piece of information. The attribute generally refers to an attribute of content of the information, which is a field (genre) of information, the importance of immediacy (whether immediacy is emphasized in information) or the like. Further, the medium recognizing section 152 may have a configuration capable of recognizing an attribute of the medium detected from the photographed image data. In this case, the attribute may be the type of the medium (magazines, books, newspapers, or other printed material), for example, or may be an attribute relating to update of the medium (whether the medium is a periodical publication), or may be other attributes.

The medium recognizing section 152 is not limited to the attribute based on the content of each recognized piece of information, but may identify each recognized piece of information as content to specify an attribute of the content. Further, the medium recognizing section 152 may recognize the medium as one piece of content to specify an attribute of the medium. For example, the medium recognizing section 152 may specify attributes of settlement, delivery and distribution of the recognized content. More specifically, the medium recognizing section 152 may specify attributes of the title of a magazine, the title of a book, a publisher, the time or date of publication, the place or location of publication and the like, with respect to the medium as the content or the medium on which the information as the content is written. Further, for example, the medium recognizing section 152 has a function of authenticating whether the user of the head-mounted display device HM has a right relating to the recognized content, and may recognize, as an attribute, whether the authentication is successful. In this case, the medium recognizing section 152 specifies whether the content is content for which the user purchases a permanent or time-limited audience right or user right, on the basis of information relating to a settlement history of the content performed by the user of the head-mounted display device, or the like.

The medium recognizing section 152 may obtain, from the outside, information for specifying the attributes in settlement, delivery and distribution of the content, information for performing settlement of the user right or the like relating to the content, information relating to the settlement history, and the like. The information may be obtained from the server 6 (to be described later), may be stored in the storage section 120 built-in in advance, may be read on the basis of a barcode or the like attached to the medium, or may be obtained by reading an IC tag attached to the medium by a reader (not shown).

The medium recognizing section 152 may specify only one or plural attributes among the above-described various attributes, or may specify all the attributes.

The update processing section 154 included in the control section 140 determines whether new information corresponding to each piece of information recognized by the medium recognizing section 152 (referred to as "update information" in the present embodiment) is present. That is, the update processing section 154 executes obtainment of the update information by the update information obtaining section 156. The update information obtaining section 156 accesses the server 6 on the basis of the attribute of the medium specified by the medium recognizing section 152 and/or the attribute of each piece of information, and obtains, in a case where the corresponding information is present in the information held by the server 6, the information as the update information. The update information obtaining section 156 outputs the update information obtainment result from the server 6 to the update processing section 154. The update processing section 154 determines the presence or absence of the update information corresponding to each piece of information recognized by the medium recognizing section 152 on the basis of the result output by the update information obtaining section 156. The update processing section 154 sets, in a case where the update information can be obtained, information that serves as a base of the update information as update target information. That is, the update processing section 154 substantially selects the update target information on the basis of the attribute, and the selected information is updated as described later.

Various types of information provided by a publishing company as a publisher that publishes a newspaper or magazine, a broadcasting station, an information delivery source or the like are successively stored in the server 6, and the information is searched on the basis of attributes to be obtained. The server 6 that the communication interface 185 may access through the communication line 5 is not limited to one in its number, and plural servers 6 may be used. Further, the communication line 5 may employ an open network such as the Internet, for example, and a web server or the like that is not intended to be used by the head-mounted display device HM may be used as the server 6. In this case, the update information obtaining section 156 may execute a search using, as a search key word, an attribute of information recognized by the medium recognizing section 152 or a character string or the like corresponding to the attribute and using a search engine that is usable through the Internet, and may obtain information on the basis of the search result. Further, the server 6 may be configured to autonomously collect information capable of being obtained through the Internet from a different server. As described above, a specific configuration of the server 6 is not limitative, and it is sufficient if the information can be obtained as the head-mounted display device HM performs data communication.

The update processing section 154 sets information from which the update information is obtained, among the information recognized by the medium recognizing section 152, as an update target. The update processing section 154 generates a mask image that hides information to overlap with a position (area) where the update target information recorded on the medium is viewed, and outputs the result to the display control section 190. That is, the update processing section 154 arranges update information corresponding to the update target information to overlap with the update target information. The update information that is arranged to overlap with the update target information and is displayed may be information on a text, an image or the like. Further, a configuration in which the update target information is hidden may be used. In the present embodiment, the update information overlaps with the mask image to form an overlap image.

The mask image is an image that reduces the visibility of the update target information in the outside scene viewed by the user through the image display section 20, which is an image having a color with high brightness, for example. The update processing section 154 determines the position and size of the mask image so that the mask image does not impair the visibility of information that is not the update target. Mask image data 126 made by data that designates the color, shape or the like of the mask image, or made by mask data itself that is usable as the mask image is stored in the storage section 120. The update processing section 154 generates the mask image using the mask image data 126.

As described above, the update information displayed in the present embodiment is the image that overlaps with the mask image. Thus, in a case where the update information is arranged to overlap with the information on the medium viewed by the user, the update target information on the medium goes out of sight. Here, only the update information that does not include the mask image may be arranged to overlap with the update target information to be displayed so that the update target information is visible. Further, the update information may be information on a text, an image or the like, of a type that reduces the visibility of the update target information on the medium in the case of being displayed, or may be information displayed without reducing the visibility of the update target information.

Hereinafter, the operation of the head-mounted display device HM will be described while showing a specific display example.

Figure 4:
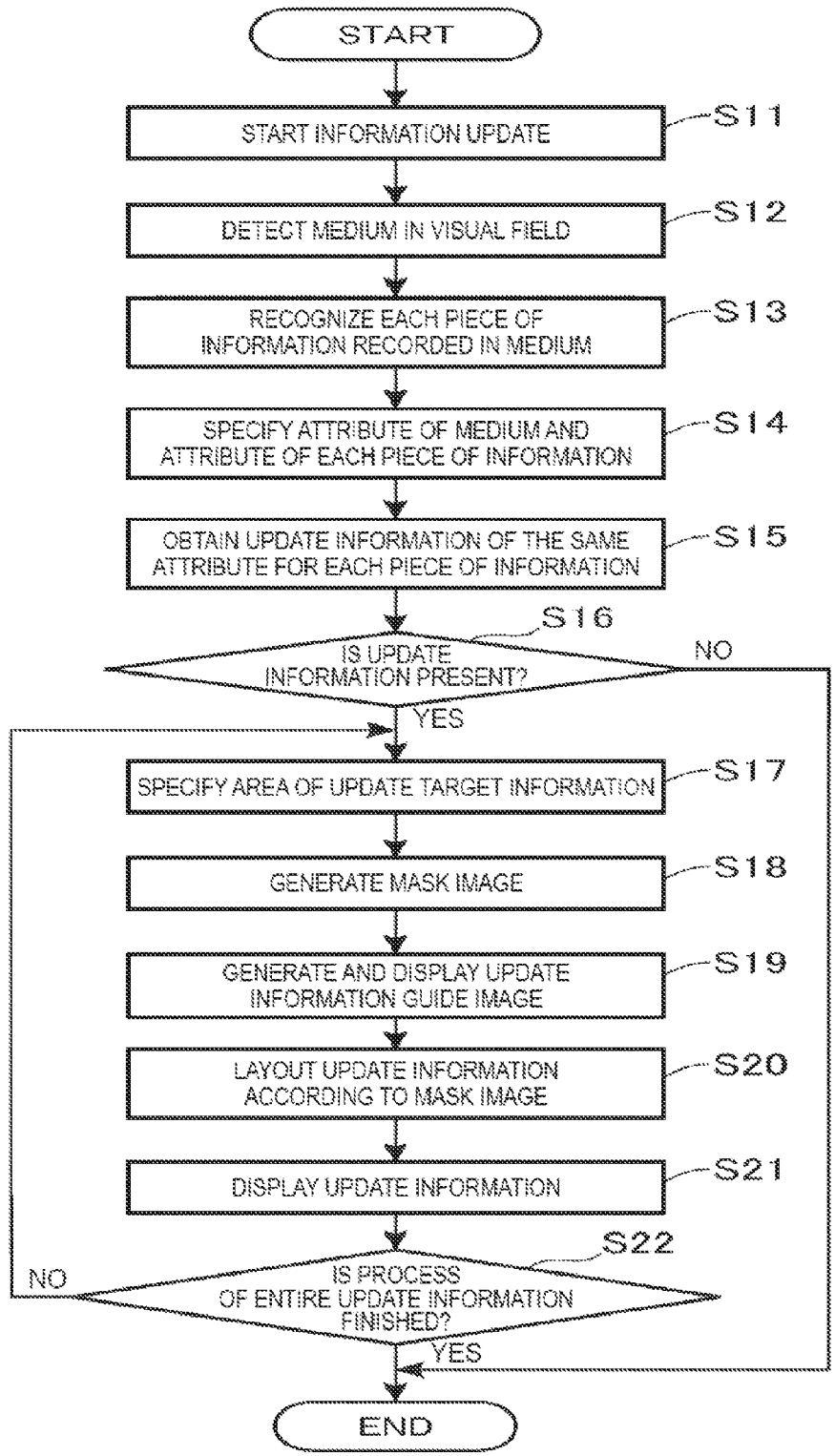
FIG. 4 is a flowchart illustrating an operation of a head-mounted display device.

FIG. 4 is a flowchart illustrating the operation of the head-mounted display device HM, and particularly, illustrates an operation of updating and displaying information that is visibly recorded on a medium.

Figure 5A:
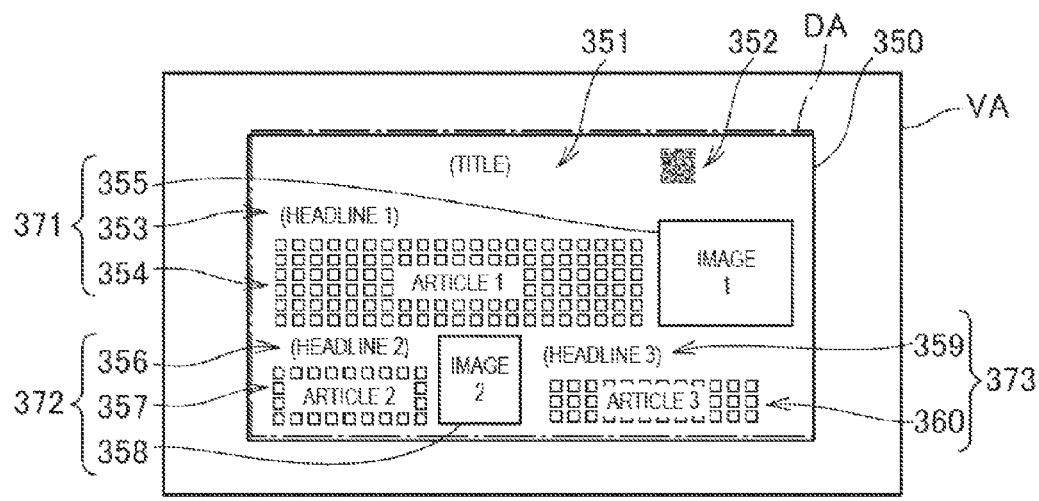
Figure 5B:
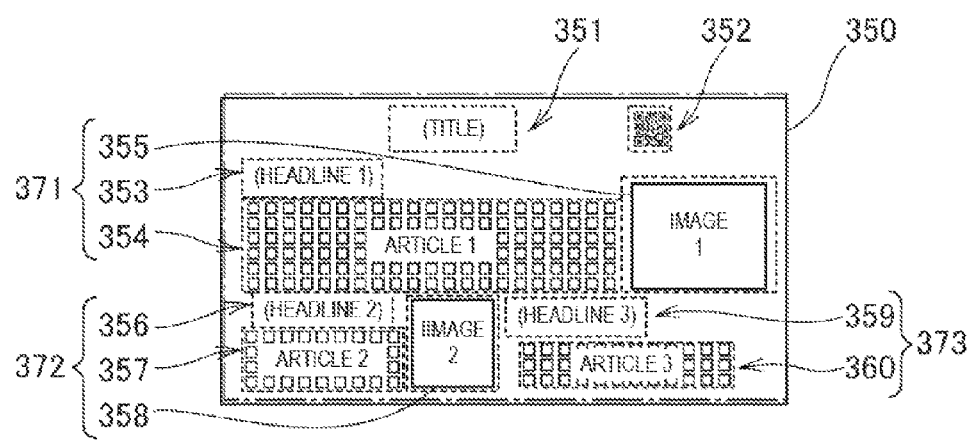
Figure 6A:
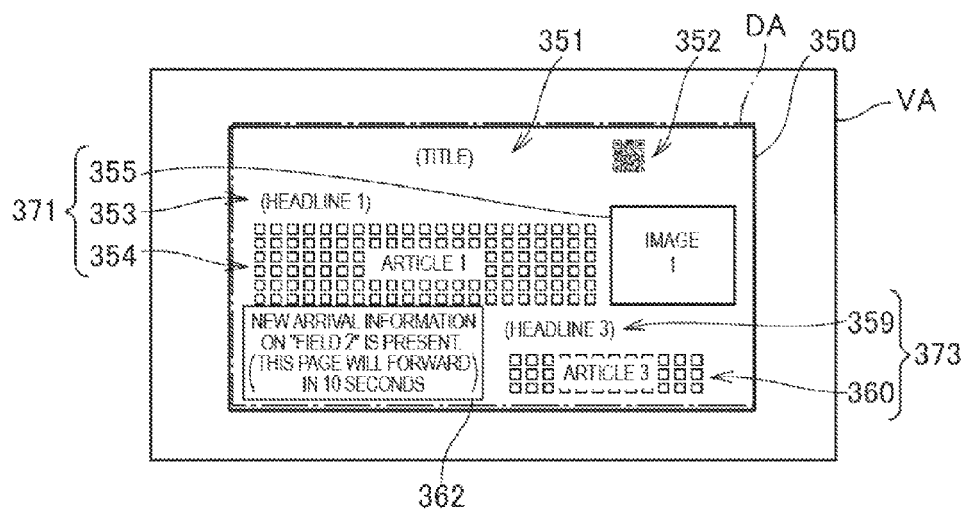
Figure 6B:
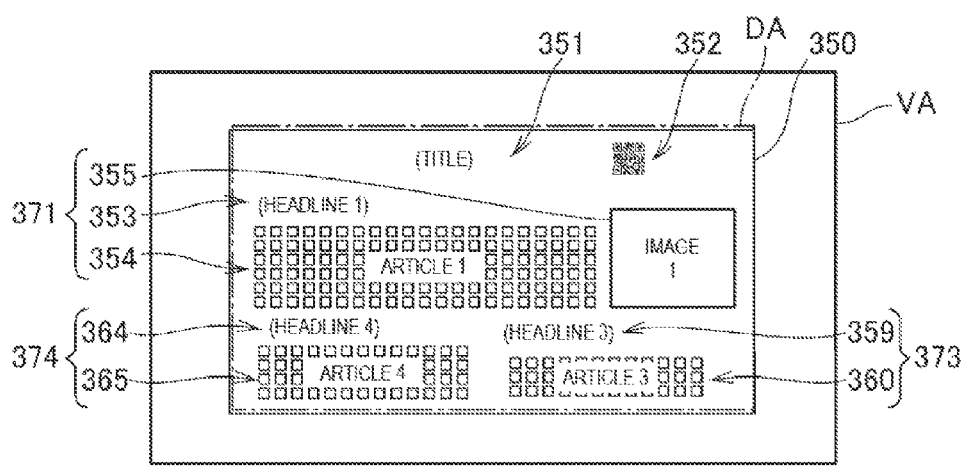

FIGS. 5A and 5B and FIGS. 6A and 6B are diagrams illustrating an operation in which the head-mounted display device HM updates and displays information. FIG. 5A is a diagram illustrating a state where a processing target medium is viewed, FIG. 5B is a diagram illustrating an example of an operation of recognizing the medium, FIG. 6A is a diagram illustrating a state where a guide for information updating is displayed, and FIG. 6B is a diagram illustrating a state where information is updated. FIGS. 5A, 6A and 6B show images viewed by a user.

FIGS. 5A and 5B and FIGS. 6A and 6B show horizontal writing newspaper as an example of the medium. As is obvious, an arrangement or description direction of information on the medium is not limited thereto. A (vertical writing) medium on which information is vertically arranged may be used as a processing target.

Reference sign VA in FIGS. 5A and 5B and FIGS. 6A and 6B represents a field of vision (visual field) of a user who wears the head-mounted display device HM, and reference sign DA represents a displayable area in the image display section 20. The displayable area DA represents a range where an image is viewed by the image light L, and is determined by displayable ranges of the right LCD 241 and the left LCD 242, the sizes of the right backlight 221 and the left backlight 222, optical characteristics of the right projection optical system 251, the left projection optical system 252, the right light guide plate 261 and the left light guide plate 262, and the like. In the present embodiment, the displayable area DA of a rectangular shape is present approximately at the center of the field of vision VA. The head-mounted display device HM may display an image in the displayable area DA.

If an information update display is instructed by operation of the touch pad 14 (FIG. 1) and the cross key 16 (FIG. 1), in step S11 in FIG. 4, the control section 140 starts the process of updating and displaying the information to cause the camera 61 to execute photographing, and in step S12, the medium recognizing section 152 detects a medium from photographed image data. In the next step S13, the medium recognizing section 152 recognizes information recorded on the detected medium.

In the example in FIG. 5A, a newspaper 350 as a medium is viewed at a position where it approximately overlaps with the displayable area DA. The position of the medium does not necessarily entirely overlap with the displayable area DA, but it is preferable that at least a part thereof overlap with the displayable area DA. On the space of the newspaper 350, a title 351 of the newspaper 350 and a QR (registered trademark) code 352 indicating attributes (title, name of publisher, date of publication, configuration of the space, page and the like) of the newspaper 350 or code numbers or the like corresponding to these attributes are printed, and plural articles are also printed. That is, a first article 371 that includes a headline 353, an article text 354 and an image 355; a second article 372 that includes a headline 356, an article text 357 and an image 358; and a third article 373 that includes a headline 359 and an article text 360 are printed thereon.

The medium recognizing section 152 extracts the entire image of the newspaper 350 from the photographed image data obtained by photographing a range by the camera 61 that includes the field of vision VA. Further, the medium recognizing section 152 recognizes the title 351, the QR code 352, the headlines 353, 356 and 359, the article texts 354, 357 and 360, and the images 355 and 358, as indicated by dashed lines in FIG. 5B, respectively. An algorithm for this recognition may employ an arbitrary known algorithm. For example, the algorithm may be realized by detection of pixels that form characters or an image on the basis of RGB data on respective pixels that form the image of the newspaper 350, and by combination with a character recognition process, an image extraction process or the like. Further, the medium recognizing section 152 recognizes a combination of the title 351, the QR code 352, the headlines 353, 356 and 359, the article texts 354, 357 and 360 and the images 355 and 358, to thereby recognize the first article 317, the second article 372 and the third article 373. Here, the medium recognizing section 152 may decode the QR code 352 to obtain a character string.

In the newspaper 350, the medium recognizing section 152 may print a closing line to easily recognize the boundary of the first article 371, the second article 372 and the third article 373, or may add barcodes or signs to the headlines 353, 356 and 359, the article texts 354, 357 and 360 and the images 355 and 358 for printing.

In step S14 in FIG. 4, the medium recognizing section 152 specifies the attribute of the detected medium and the attribute of each piece of recognized information. For example, the medium recognizing section 152 may recognize character strings included in the recognized headlines 353, 356 and 359 and the article texts 354, 357 and 360 as shown in FIG. 5B, and may compare the recognized character strings with an attribution determination database stored in the storage section 120 in advance to specify each attribute of the headlines 353, 356 and 359 and the article texts 354, 357 and 360. Further, for example, the medium recognizing section 152 may calculate a characteristic amount that indicates characteristics of the images 355 and 358, and may compare the characteristic amount with the attribution determination database stored in the storage section 120 in advance to specify the attributes of the respective images 355 and 358. Further, the medium recognizing section 152 may specify the attributes of the first article 371, the second article 372 and the third article 373 on the basis of the attributes of the headlines 353, 356 and 359, the article texts 354, 357 and 360 and the images 355 and 358. Further, for example, on the basis of a method of comparing the character string or the like obtained by decoding the title of the newspaper 350 or the QR code 352 with the above-mentioned database, or on the basis of each attribute, arrangement, headline, number of images or the like of the headlines 353, 356 and 359, the article texts 354, 357 and 360 and the images 355 and 358, it is possible to specify the attribute of the newspaper 350. Further, in the newspaper 350, a character string encoded as the QR code 352 may be information indicating the attribute of the newspaper 350, and information indicating the attributes of the first article 371, the second article 372 and the third article 373 may be added to the headlines 353, 356 and 359 as QR codes or barcodes. In this case, the medium recognizing section 152 may decode the QR codes or the barcodes to specify the attribute of the newspaper 350 or the attributes of the respective articles. Further, in step S14, the medium recognizing section 152 may specify attributes of settlement, delivery or distribution of the recognized medium or each piece of information, as described above.

In step S15 in FIG. 4, the update information obtaining section 156 attempts obtainment of update information on the basis of the attribute of each piece of information for each piece of information recognized by the medium recognizing section 152, and outputs the obtainment result to the update processing section 154. An information unit where the update processing section 154 obtains the update information is a unit determined by the medium recognizing section 152. For example, in the example in FIGS. 5A and 5B, the update information is obtained with respect to each of the first article 371, the second article 372 and the third article 373.

In step S16, the update processing section 154 determines the presence or absence of the update information on the basis of the obtainment result output from the update information obtaining section 156. Here, if the update processing section 154 determines that the update information is not obtained at all (No in step S16), the control section 140 finishes the present process.

On the other hand, if it is determined that the update information obtaining section 156 obtains the update information (Yes in step S16), the update processing section 154 goes to step S17, and then, specifies, with respect to one piece of update information, an area of update target information corresponding to the update information. That is, the update processing section 154 specifies the position of the update target information in the photographed image data, specifies an area of the displayable area DA that overlaps with the position, and calculates pixels of the right LCD 241 and the left LCD 242 corresponding to the specified area. Thus, pixels in which the update information that overlaps with the update target information is arranged are specified. The specified pixels are specified as pixels that display a mask image that hides the update target information, in the present embodiment.

In step S18, the update processing section 154 generates a mask image that causes the pixels specified in step S17 to be displayed with a predetermined color. In step S19, the update processing section 154 generates image data on a guide image for notifying the user to update information that is currently viewed, and outputs the result to the display control section 190 to be displayed by the image display section 20. The guide image is an image obtained by overlapping a guide message (character string) with the mask image generated in step S18.

FIG. 6A shows a display example in a case where update information is obtained with respect to the second article 372. In FIGS. 5A and 5B, a guide image 362 is displayed to overlap with the area where the second article 372 is viewed. The guide image 362 is an image obtained by overlapping the guide message with the mask image, and the background of the guide image 362 has a color of the mask image. As described above, this color corresponds to a color or light intensity that reduces the visibility of the outside scene viewed through the light adjusting plate 20A, the right light guide plate 261 and the left light guide plate 262. The size and position of the guide image 362 are adjusted not to reduce the visibility of the first article 371 or the third article 373 that is not the update target. The color of the mask image may match with the background color (ground color) of the newspaper 350.

In step S20 in FIG. 4, the update processing section 154 generates the layout of the character string or image that forms the update information obtained in step S15 according to the size or shape of the mask image generated in step S18, to thereby generate image data for display of the update information. In step S21, the update processing section 154 outputs the generated image data to the display control section 190 for display. Here, the update processing section 154 adjusts the time when the image data is output to the display control section 190 so that the update information is displayed from a predetermined time after the guide image is displayed in step S19.

FIG. 6B shows an example in which update information is displayed with respect to the second article 372. A fourth article 374 instead of the second article 372 is displayed at the position where the guide image 362 is displayed in FIG. 6A. The fourth article 374 uses a mask image as a background, and includes a headline 364 and an article text 365. Character sizes of the headline 364 and the article text 365, word count of one line, number of lines or the like are set according to the mask image.

As shown in FIG. 6B, the new fourth article 374 instead of the second article 372 (FIGS. 5A and 5B) is displayed to the user, and thus, the user may obtain the latest information even though the newspaper 350 itself is old. Further, since the second article 372 that is actually printed on the newspaper 350 is hidden by the mask image, the user may clearly view the fourth article 374.

In step S22 in FIG. 4, the update processing section 154 determines whether the update information obtaining section 156 displays the entire update information obtained in step S15. If the processing of the entire update information is finished (Yes in step S22), the update processing section 154 finishes the present process. If the update information that is not displayed yet is present (No in step S22), the procedure returns to step S17 to perform the process of displaying the next update information.

In a case where the update information obtaining section 156 obtains plural pieces of update information in step S15, it is possible to collectively process the entire update information. In this case, the update processing section 154 specifies an area of the update target information with respect to the entire update information in step S17, and generates a mask image that hides the entire update target area in step S18. In step S20, the update processing section 154 generates the layout of a character string or image that forms the entire update information according to the mask information. In step S20, the update processing section 154 may perform the layout not to disturb the correspondence relation between the update target information and the update information. In this case, since the plural pieces of information are collectively updated, the user may reduce the waiting time for information updating. Further, in a case where only the update information is arranged to overlap with the update target information on the medium for display without using the mask image, the update processing section 154 may generate large update information that is a bundle of the plural pieces of update information. In this case, the update processing section 154 specifies an area of the update target information with respect to the entire update information in step S17, and generates an image having a size and shape that overlaps with the entire area of the update target in step S18. Plural pieces of update information corresponding to plural pieces of update target information are included in this image. In this case, by collectively updating the plural pieces of information, it is similarly possible to reduce the waiting time.

In a state where the operation in FIG. 4 is executed at least once and the update information is displayed by the head-mounted display device HM, it is possible to execute the operation in FIG. 4 again.

In this case, the update processing section 154 determines whether the medium detected by the medium recognizing section 152 in step S12 is the same medium as the medium detected in step S12 of the previous operation, and performs the same operation as described above in a case where it is determined that the mediums are different from each other.

Further, in a case where it is determined that the mediums are the same, the update processing section 154 may omit the operations of step S13 and S14 in the medium recognizing section 152. For example, if the newspaper 350 is the same, since the printed articles are not changed, it is not necessary to perform recognition or attribution specification again.

Then, the update information obtaining section 156 accesses the server 6 by the communication interface 185 in step S15 and attempts obtainment of update information, but does not obtain the same information as the update information obtained in step S15 of the previous operation. Accordingly, it is preferable that the update information obtaining section 156 have a function of determining whether the update information obtained from the server 6 is the same as the update information that is already obtained.

In step S19, in a case where an update guide message overlaps with the mask image to generate image data on the guide image, the update processing section 154 executes a process of displaying the image data on the guide image to overlap with the image data that is currently displayed. Further, in step S21, in a case where the image data including the update information is generated, the update processing section 154 executes a process of displaying the image data including the update information to overlap with the image data that is currently displayed. The process of overlapping the image data may be performed by the update processing section 154 or the display control section 190. Thus, it is possible to retain the display of the update information displayed in the previous operation, and to display a guide message or update information corresponding to newly obtained update information.

Further, the update processing section 154 may select in advance information that may be an update target from the information recognized by the medium recognizing section 152 in step S13, and may perform the processes of step S15 to step S21 only with respect to the selected information. In this case, the update processing section 154 may select the information on the basis of the attribute of each piece of information specified by the medium recognizing section 152. In this case, for example, it is possible to cause information set as information that is not to be updated to be viewed without updating even though the information is not the latest information. Further, if a configuration is used in which a user performs a setting relating to the information that is not to be updated and the update processing section 154 selects the information according to the setting, it is possible to maintain information that the user does not want to update, without updating.

Further, the control section 140 may execute the operation in FIG. 4 every predetermined time until an instruction for stopping the information updating is input by operation of the touch pad 14 or the cross key 16. In this case, since the information is updated every predetermined time, the user may obtain the latest information.

Further, the medium that is a target recognized by the head-mounted display device HM may be a display surface of a different display device that displays an image on the display surface, and the head-mounted display device HM may display new information to overlap with the information displayed on the display surface. For example, the medium recognizing section 152 may recognize the information displayed on the display surface to specify an attribute of the information, an attribute of the entire screen including the information, or an attribute of the display device that displays the information, and the update processing section 154 may obtain the information, to thereby perform the display. In this case, even though the information displayed in the display device that the user views through the head-mounted display device MH is not changed, the head-mounted display device MH may display the updated information, and thus, the user may view the latest information. In this case, the head-mounted display device HM and the different display device viewed by the user through the head-mounted display device HM may execute communication, and the head-mounted display device HM may obtain attributes of the information displayed by the different display device, or the like. A specific configuration of the different display device may include a display of a notebook computer, a tablet computer or a desktop computer, a portable electronic device including a game machine, a mobile phone, a smart phone or a portable media player, a display included in other exclusive devices, or the like.

As described above, the head-mounted display device HM according to the embodiment to which the invention is applied includes the display section that displays the image that is viewed to overlap with the outside scene, the medium recognizing section 152 that detects the medium that is viewed as the outside scene, and the update processing section 154 that arranges and causes the display section to display new information corresponding to information recorded on the medium in an overlap area to overlap with at least a part of the information recorded on the medium. Thus, it is possible to display the new information to overlap with at least a part of the information recorded on the medium. Thus, it is possible to display the latest information instead of the information recorded on the medium such as a magazine or newspaper. Further, there is an advantage in that the display of the information is performed as if new information is recorded on the medium. Thus, it is possible to display information with excellent usability similarly to the existing medium such as a magazine or newspaper, and to immediately provide the information. Furthermore, in the above-described embodiment, the update information corresponding to the update target information is arranged to be displayed using the mask information to hide the update target information recorded on the medium. Thus, it is possible to replace the update target information by the update information to be viewed.

Further, the medium recognizing section 152 determines the attribute of the information recorded on the medium, the update information obtaining section 156 obtains the new information on the basis of the attribute of the information on the target (update target) that overlaps with the update information by the display section, and the update processing section 154 causes the display section to display the new information obtained by the update information obtaining section 156. Thus, in a case where the update information is displayed in an overlap manner, it is possible to display the new information relating to the overlapped information.

Further, since the update processing section 154 selects the update target information from the information recorded on the medium on the basis of the attribute of the information determined by the medium recognizing section 152, in a case where plural pieces of information are recorded on the medium, it is possible to appropriately select the information to thereby provide new information.

Further, the update processing section 154 selects information from which the obtainment of the new information is possible by the update information obtaining section 156 from the information recorded on the medium as the update target information. Thus, for example, in a case where it is possible to provide the new information, by hiding the information on the medium, it is possible to appropriately select the information to provide the latest information.

Further, since the update processing section 154 arranges the new information according to the shape and size of the area where the information on the medium is hidden, it is possible to appropriately provide the latest information without disturbing the visibility of different information recorded in the periphery of the hidden information.

Further, since the display device is provided as the head-mounted display device HM, the medium recognizing section 152 includes the camera 61 that photographs the outside scene in the range that overlaps with an image displayed by the display section, and the medium recognizing section 152 detects the medium from the photographed image photographed by the camera 61, it is possible to automatically provide the latest information that overlaps with the information on the medium to be viewed by a wearer, and to further improve the convenience.

Further, the display section of the head-mounted display device HM includes the right display drive section 22 and the left display drive section 24 that generate and emit image light indicating an image using display image data, and the right light guide plate 261 and the left light guide plate 262 that guide the emitted image light to the eyes of the user. The light of the outside scene passes through the right light guide plate 261 and the left light guide plate 262 and is incident onto the right eye RE and the left eye LE of the user together with the image light.

Thus, it is possible to display new information to overlap with the information viewed as the outside scene, using the head-mounted display device in which the image light is guided to the right eye RE and the left eye LE by the right light guide plate 261 and the left light guide plate 262, and the light of the outside scene passes through the right light guide plate 261 and the left guide plate 262 to be guided to the right eye RE and the left eye LE. Accordingly, it is possible to update the information viewed by the user using the display device, and to provide a variety of information to the user.

Further, the head-mounted display device HM according to the embodiment detects information that is viewable by the user by the medium recognizing section 152, and causes different information corresponding to the detected information to overlap with at least a part of the detected information to be displayed by a display section that performs display to be viewable by the user. Thus, it is possible to change or update the information viewed by the user using the display device, and thus, it is possible to provide different information to the user without changing the information itself that is present in the range that is viewable by the user.

Further, the invention may be applied without limitation to the head-mounted display device HM mounted on the head of the user. For example, the invention may be applied to a notebook computer, a tablet computer or a desktop computer that is provided with a display screen, a portable electronic device including a game machine, a mobile phone, a smart phone or a portable media player, a display device such as other exclusive devices, or the like. Further, the invention may be applied to a head-mounted display device that includes a display section that does not transmit external light and light of the outside scene does not reach the eyes of the user. That is, in a case where an image file, a portable document format (PDF) file, a text file or other files including information are displayed by the display device, the display device may display, to overlap with at least a part of the information displayed on the display screen, different information corresponding to the information (overlap target information). In this case, it is possible to change or update a part or all of the information to be displayed without changing the content of the file that is being displayed by the display device. In this case, when displaying a so-called e-book file by the display device, it is possible to replace information included in the e-book with different information for display without changing data in the e-book. Further, it is possible to display information as if information recorded on the e-book is updated as the latest information using the file of the e-book that imitates the medium such as a magazine or newspaper. Thus, it is possible to display information with excellent usability similarly to the existing medium such as a magazine or newspaper, and to immediately provide the information without changing the file itself of the e-book. Here, a display mode of the different information is not limited to the mode that overlaps with the target, but may be any mode in which the correspondence of the different information to the target information to be changed or updated can be viewed. For example, the different information may be displayed at a position or area that is separate from the area where the target information is displayed. In this case, by associating the target information with the different information by a straight line, a figure or a symbol (for example, a speech balloon or note), the correspondence relationship with the target information may be viewed.

The above-described embodiment is an example to which the invention is applied, and the configuration of the invention and the application range of the invention are not limited to the configuration of the above embodiment. For example, the method of hiding the information recorded on the medium is not limited to the method of displaying the mask image by the right LCD 241 and the left LCD 242. A method of relatively lowering the visibility of the update target information by improving the visibility of information other than the update target information that is a target to be hidden may also be used. Further, the visibility of the information may be lowered by other methods. Still further, in the above embodiment, the example in which the head-mounted display device HM displays the new information to overlap with the update target information recorded on the medium has been described, but any modification example in which the different information corresponding to the update target information is displayed may be used as the embodiment of the invention. Further, the invention is not limited the example in which the new information or the different information is displayed to overlap with the update target information, and the new information or the different information may be displayed at a position or area different from the area where the update target information is displayed. In this case, by associating the update target information with the different information (or the new information), the correspondence relationship between the respective pieces of information may be viewed, in which the correspondence relationship may be clearly indicated by a symbol, a figure, a character or a color scheme.

Further, in the above embodiment, the configuration in which the image display section 20 that a user wears like glasses is provided has been described as an example, but the invention is not limited thereto. An image display section that a user wears like a cap, an image display section assembled in a helmet or the like, instead of the image display section 20, may be provided. Further, the earphones 32 and 34 may employ an ear hook type or a head band type, or may be removed.

Further, in the above embodiment, for example, the configuration has been described in which the image light generating section includes the right backlight 221, the left backlight 222, the right backlight control section 201, the left backlight control section 202, the right LCD 241, the left LCD 242, the right LCD control section 211 and the left LCD control section 212. This embodiment is merely an example, and thus, the image light generating section may include a configuration for realizing a different method together with the above configuration or instead of the configuration. For example, the image light generating section may have a configuration that includes a self-luminous display such as an organic electro-luminescence (EL) panel, and a control section that controls light emission thereof. Further, the image light generating section may use LCOS (liquid crystal on silicon; registered trademark), a digital micro-mirror device (DMD) or the like, instead of the LCD. In this case, the image light generating section includes alight source such as LEDs, and modulates light emitted from the light source by the LCOS or DMD to generate image light.

Further, for example, it is also possible to apply the invention to a head-mounted display of a laser retinal projection type. That is, the image light generating section may be configured to include a laser light source and an optical system that guides the laser light source to the eyes of the user, and to cause laser light to be incident onto the eyes of the user for scanning on the retinas to form images on the retinas so that the user can view an image. In a case where the head-mounted display of the laser retinal projection type is employed, an "area where image light can be emitted in the image light generating section" may be defined as an image area recognized by the eyes of the user.

The optical system that guides the image light generated by the image light generating section in the head-mounted display to the eyes of the user may be configured to include an optical member that transmits outside light that is incident onto the device from the outside, and to cause the outside light to be incident onto the eyes of the user together with the image light. Further, the optical system may employ an optical member that is disposed in front of the eyes of the user to overlap a part or all of the visual field of the user. Further, the optical system may employ a scanning method which scans a laser beam or the like and forms an image light. Further, the optical system is not limited to a configuration that guides the image light inside the optical member, but may be configured to have a function of refracting and/or reflecting the image light toward the eyes of the user for guidance.

Further, the invention may be applied to a display device that uses a MEMS display technology.

The head-mounted display device HM of the embodiment has a configuration in which the light generated by the image light generating section including the right backlight 221, the left backlight 222, the right backlight control section 201, the left backlight control section 202, the right LCD 241, the left LCD 242, the right LCD control section 211 and the left LCD control section 212 is guided to the eyes of the user by the light guide plates 261 and 262.

On the other hand, a scanning optical system using a MEMS mirror may be employed. That is, an image display element may include a signal light forming section, a scanning optical system that has the MEMS mirror that scans light emitted from the signal light forming section, and an optical member that forms a virtual image by the light scanned by the scanning light optical system. In this configuration, the light emitted by the signal light forming section is reflected by the MEMS mirror, is incident onto the optical member, is guided in the middle of the optical member, and reaches a virtual image forming surface. As the MEMS mirror scans the light, a virtual image is formed on the virtual image forming surface. The user captures the virtual image by the eyes to recognize the image. The optical component in this case may be an element that guides light through plural reflections like the right light guide plate 261 and the left light guide plate 262 in the above embodiment, and the virtual image forming surface may be a half mirror surface like the face 262A.

In the operation described in FIG. 4 according to the embodiment, the control section 140 controls the information display and update area using the pixels of the right LCD 241 and the left LCD 242 as the unit. In a case where the MEMS display technology is employed, the control section 140 performs processing with reference to the area scanned by the MEMS mirror and the range where the virtual image is formed by this scanning. Thus, it is possible to realize the invention using the MEMS display technology, and to perform the change or updating of the medium information.

Further, the display device of the invention is not limited to the above-described head-mounted display device, but may be applied to various display devices such as a flat panel display, a projector or the like.

Further, the embodiment of the invention is not limited to the configuration in which the program executed by the control section 140 is stored in the storage section 120. For example, the program may be stored on a computer-readable portable recording medium, a storage device that is externally connected to the control device 10, or a device connected to the control device 10 through a wired or wireless communication line. In this case, the control device 10 may read the program for execution as necessary. Details of the other configurations of the head-mounted display device HM may be arbitrarily modified.

The entire disclosure of Japanese Patent Application No. 2013-000362, filed Jan. 7, 2013 is expressly incorporated by reference herein.

What is claimed is:

1. A display device comprising:
a detecting section that detects printed information that is viewable by a user and a publication associated with the printed information, the publication including a plurality of content sections;
a display section that performs display to be viewable by the user;
an attribute determining section that determines a publication date of at least one content section recorded on the printed information;
an information obtaining section that obtains a different content section corresponding to the detected publication, the different content section having a publication date after the publication date of the at least one content section that is a target with which the different content section overlaps; and
a control section that causes the display section to display the different content section obtained by the information obtaining section to overlap with at least a part of the at least one content section recorded on the printed information detected by the detecting section.

2. The display device according to claim 1, wherein
the detecting section detects a code recorded on the printed information, and
the attribute determining section determines the publication date of the at least one content section recorded on the printed information based on information associated with the detected code.

3. The display device according to claim 2, wherein the detecting section detects the publication associated with the printed information based on information associated with the detected code.

4. The display device according to claim 2, wherein the code comprises at least one of a barcode, a QR code, and a numerical code.

5. A display device comprising:
a display section that displays an image to overlap with an outside scene;
a medium detecting section that detects a printed medium viewed as the outside scene and a publication associated with the printed medium, the publication including a plurality of content sections;
an attribute determining section that determines a publication date of at least one content section recorded on the printed medium;
an information obtaining section that obtains a new content section corresponding to the detected publication, the new content section having a publication date after the publication date of the at least one content section that is a target with which the different content section overlaps; and
a control section that arranges and causes the display section to display, in an overlap area, the new content section obtained by the information obtaining section to overlap with at least a part of the at least one content section recorded on the printed medium.

6. The display device according to claim 5,
wherein the control section selects an update target content section from the at least one content section recorded on the printed medium on the basis of the publication date of the at least one content section determined by the attribute determining section.

7. The display device according to claim 6,
wherein the control section selects at least one content section from which the new content section is obtainable by the information obtaining section from among the plurality of content sections recorded on the publication associated with the printed medium, as the update target content section.

8. The display device according to claim 5,
wherein the control section arranges the new content section according to the shape and size of an area where at least one content section on the printed medium is hidden.

9. The display device according to claim 5,
wherein the display device is provided as a head-mounted display device, and
wherein the medium detecting section includes a photographing section that photographs the outside scene in a range that overlaps with the image displayed by the display section, and an image processing section that detects the printed medium and the publication associated with the printed medium from an image photographed by the photographing section.

10. The display device according to claim 5,
wherein the display device is a head-mounted display device that causes a user to view an image,
wherein the display section includes:
   an image light generating section that generates and emits image light for display of an image using display image data; and
   an optical member that guides the emitted image light to eyes of the user, and
wherein light of the outside scene passes through the optical member and is incident onto the eyes of the user together with the image light.

11. A control method of a display device, comprising:
detecting printed information that is viewable by a user;
detecting a publication associated with the printed information, the publication including a plurality of content sections;
determining a publication date of at least one content section recorded on the printed information;
obtaining a new content section corresponding to the detected publication, the new content section having a publication date after the publication date of the at least one content section that is a target with which the new content section overlaps; and
displaying, by a display section that performs display to be viewable by the user, the new content section obtained by the information obtaining section to overlap with at least a part of the at least one content section recorded on the detected printed information.

12. A control method of a display device that includes a display section that displays an image viewed to overlap with an outside scene, the method comprising:
detecting a printed medium viewed as the outside scene;
detecting a publication associated with the printed medium, the publication including a plurality of content sections;
determining a publication date of at least one content section recorded on the printed medium;
obtaining a different content section corresponding to the detected publication, the different content section having a publication date after the publication date of the at least one content section that is a target with which the different content section overlaps; and
arranging and causing the display section to display, in an overlap area, the different content section obtained by the information obtaining section to overlap with at least a part of the at least one content section recorded on the printed medium.

* * * * *